United States Patent
Yum et al.

(10) Patent No.: US 11,051,198 B2
(45) Date of Patent: Jun. 29, 2021

(54) METHOD FOR CHANNEL AND INTERFERENCE MEASUREMENT IN WIRELESS COMMUNICATION SYSTEM AND APPARATUS THEREFOR

(71) Applicant: LG Electronics Inc., Seoul (KR)

(72) Inventors: Kunil Yum, Seoul (KR); Haewook Park, Seoul (KR); Jonghyun Park, Seoul (KR); Jiwon Kang, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 16/608,623

(22) PCT Filed: Apr. 27, 2018

(86) PCT No.: PCT/KR2018/004906
§ 371 (c)(1),
(2) Date: Oct. 25, 2019

(87) PCT Pub. No.: WO2018/199681
PCT Pub. Date: Nov. 1, 2018

(65) Prior Publication Data
US 2021/0120444 A1    Apr. 22, 2021

Related U.S. Application Data

(60) Provisional application No. 62/519,184, filed on Jun. 14, 2017, provisional application No. 62/491,237, filed on Apr. 27, 2017.

(51) Int. Cl.
*H04L 5/00*  (2006.01)
*H04W 24/10*  (2009.01)
(Continued)

(52) U.S. Cl.
CPC .......... *H04W 24/10* (2013.01); *H04B 7/0626* (2013.01); *H04L 5/0057* (2013.01); *H04W 72/082* (2013.01)

(58) Field of Classification Search
None
See application file for complete search history.

(56) References Cited

U.S. PATENT DOCUMENTS

2013/0242778 A1* 9/2013 Geirhofer ............. H04L 1/0027
370/252
2017/0078074 A1   3/2017 Liu et al.

FOREIGN PATENT DOCUMENTS

KR    20080047421    5/2008
KR    101701312      2/2017
(Continued)

OTHER PUBLICATIONS

Nokia, Alcatel-Lucent Shanghai Bell, "Interference estimation in NR," R1-1705964, 3GPP TSG RAN WG1#88 bis, Spokane, WA, USA, dated Apr. 3-7, 2017, 7 pages.
(Continued)

*Primary Examiner* — Ayanah S George
(74) *Attorney, Agent, or Firm* — Fish & Richardson P.C.

(57) ABSTRACT

A method for channel and interference measurement in a wireless communication system according to an embodiment of the present disclosure is performed by a terminal, and may comprise the steps of: receiving a resource configuration for channel and interference measurement from a base station, wherein a resource for the channel and interference measurement is shared with a plurality of terminals served by the base station; and performing channel and interference measurement on the basis of the received resource configuration for the channel and interference measurement, wherein the resource for the channel and interference measurement includes a resource in which a
(Continued)

resource for channel measurement and a resource for interference measurement are configured in a fully or partially overlapping manner, and the fully or partially overlapping resource may be configured in units of antenna ports or antenna port groups, which correspond to the resource for channel measurement.

14 Claims, 14 Drawing Sheets

(51) Int. Cl.
  *H04B 7/06* (2006.01)
  *H04W 72/08* (2009.01)

(56) References Cited

FOREIGN PATENT DOCUMENTS

| KR | 101719438 | 3/2017 |
| WO | WO2015166846 | 4/2017 |

OTHER PUBLICATIONS

Nokia Siemens Networks, Nokia, "Need for partially overlapping IMRs for Rel-11," R1-124181, 3GPP TSG RAN WG1 Meeting #70bis, San Diego, USA, dated Aug. 8-12, 2012, 5 pages.
PCT International Search Report and Written Opinion in International Application No. PCT/KR2018/004906, dated Aug. 7, 2018, 16 pages (with English translation).
Nokia, Alcatel-Lucent Shanghai Bell, "On the channel and interference estimation in NR," R1-1703177, 3GPP TSG RAN WG1#88, Athens, Greece, dated Feb. 13-17, 2017, 4 pages.
Nokia, Alcatel-Lucent Shanghai Bell, "On the CSI-RS configurations for NR CSI acquisition," R1-1705968, 3GPP TSG-RAN WG1 #88bis, Spokane, WA, USA, dated Apr. 3-7, 2017, 5 pages.
Qualcomm Incorporated, "Discussion on TM10 CSI-IM Measurements," R1-145055, 3GPP TSG RAN WG1 Meeting #79, San Francisco, USA, dated Nov. 17-21, 2014, 3 pages.
ZTE, ZTE Microelectronics, "On CSI measurements," R1-1704405, 3GPP TSG RAN WG1 Meeting #88bis, Spokane, USA, dated Apr. 3-7, 2017, 5 pages.
ZTE, ZTE Microelectronics, "Remaining issues on non-precoded CSI-RS," R1-1701835, 3GPP TSG RAN WG1 Meeting #88, Athens, Greece, dated Feb. 13 -17, 2017, 9 pages.

\* cited by examiner (a) Odd RB (b) Even RB

CMR

IMR (a) Even RB
(b) Odd RB (a) Odd RB  (b) Even RB

CMR   IMR (a) Odd RB  (b) Even RB

CMR for UE 1   IMR for UE 2

METHOD FOR CHANNEL AND INTERFERENCE MEASUREMENT IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/004906, filed on Apr. 27, 2018, which claims the benefit of U.S. Provisional Application No. 62/519,184, filed on Jun. 14, 2017, and U.S. Provisional Application No. 62/491,237, filed on Apr. 27, 2017. The disclosures of the prior applications are incorporated by reference in their entirety.

TECHNICAL FIELD

The present disclosure relates to a wireless communication system, and more particularly, to a method for channel and interference measurement and apparatus therefor.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE

Technical Problem

The object of the present disclosure is to provide a method of measuring a channel state. Specifically, the present disclosure proposes a channel and interference resource configuration where the overhead of channel and interference measurement resources is considered and a channel and interference measurement method according to the configuration.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method for channel and interference measurement in a wireless communication system, which is performed by a user equipment (UE). The method may include receiving a resource configuration for the channel and interference measurement from a base station, wherein a resource for the channel and interference measurement is shared by a plurality of UEs served by the base station, and performing the channel and interference measurement based on the received resource configuration for the channel and interference measurement. The resource for the channel and interference measurement may include a resource corresponding to a portion where a resource for the channel measurement and a resource for the interference measurement fully or partially overlap. The fully or partially overlapping resource may be configured for each antenna port or antenna port group corresponding to the resource for the channel measurement or the resource for the interference measurement or by a different code division multiplexing pattern.

Additionally or alternatively, when the fully or partially overlapping resource is configured for each antenna port, an antenna port used for the resource configuration may be cycled and used depending on a resource block including the overlapping resource.

Additionally or alternatively, a cycling pattern related to the antenna port may be included in the resource configuration or provided through separate signaling.

Additionally or alternatively, the resource for the channel measurement may correspond to a semi-persistent or periodic channel measurement resource, and the resource for the interference measurement may correspond to an aperiodic interference channel resource.

Additionally or alternatively, the method may further include, when transmission power boosting is applied to the fully or partially overlapping resource, receiving a parameter related to the transmission power boosting from the base station. In this case, the parameter related to the transmission power boosting may be used to calculate a channel quality indicator.

Additionally or alternatively, the method may include selecting a channel quality indicator index from a sub-sampled channel quality indicator table, which is defined or configured by the base station, according to results of the channel and interference measurement and reporting the selected channel quality indicator index.

In another aspect of the present disclosure, provided is a UE for performing channel and interference measurement in a wireless communication system. The UE may include a transmitter, a receiver, and a processor configured to control the transmitter and the receiver. The processor may be configured to receive a resource configuration for the channel and interference measurement from a base station, wherein a resource for the channel and interference measurement is shared by a plurality of UEs served by the base station, and perform the channel and interference measurement based on the received resource configuration for the channel and interference measurement. The resource for the channel and interference measurement may include a resource corresponding to a portion where a resource for the channel measurement and a resource for the interference measurement fully or partially overlap. The fully or partially overlapping resource may be configured for each antenna port or antenna port group corresponding to the resource for the channel measurement or the resource for the interference measurement or by a different code division multiplexing pattern.

Additionally or alternatively, when the fully or partially overlapping resource is configured for each antenna port, an antenna port used for the resource configuration may be cycled and used depending on a resource block including the overlapping resource.

Additionally or alternatively, a cycling pattern related to the antenna port may be included in the resource configuration or provided through separate signaling.

Additionally or alternatively, the resource for the channel measurement may correspond to a semi-persistent or periodic channel measurement resource, and the resource for the interference measurement may correspond to an aperiodic interference channel resource.

Additionally or alternatively, when transmission power boosting is applied to the fully or partially overlapping resource, the processor may be configured to receive a parameter related to the transmission power boosting from the base station. In this case, the parameter related to the transmission power boosting may be used to calculate a channel quality indicator.

Additionally or alternatively, the processor may be configured to select a channel quality indicator index from a subsampled channel quality indicator table, which is defined or configured by the base station, according to results of the channel and interference measurement and report the selected channel quality indicator index.

Additionally or alternatively, the UE is a part of an autonomous driving device that communicates with at least one of a network or another autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to the present disclosure, a UE can efficiently perform downlink reception.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
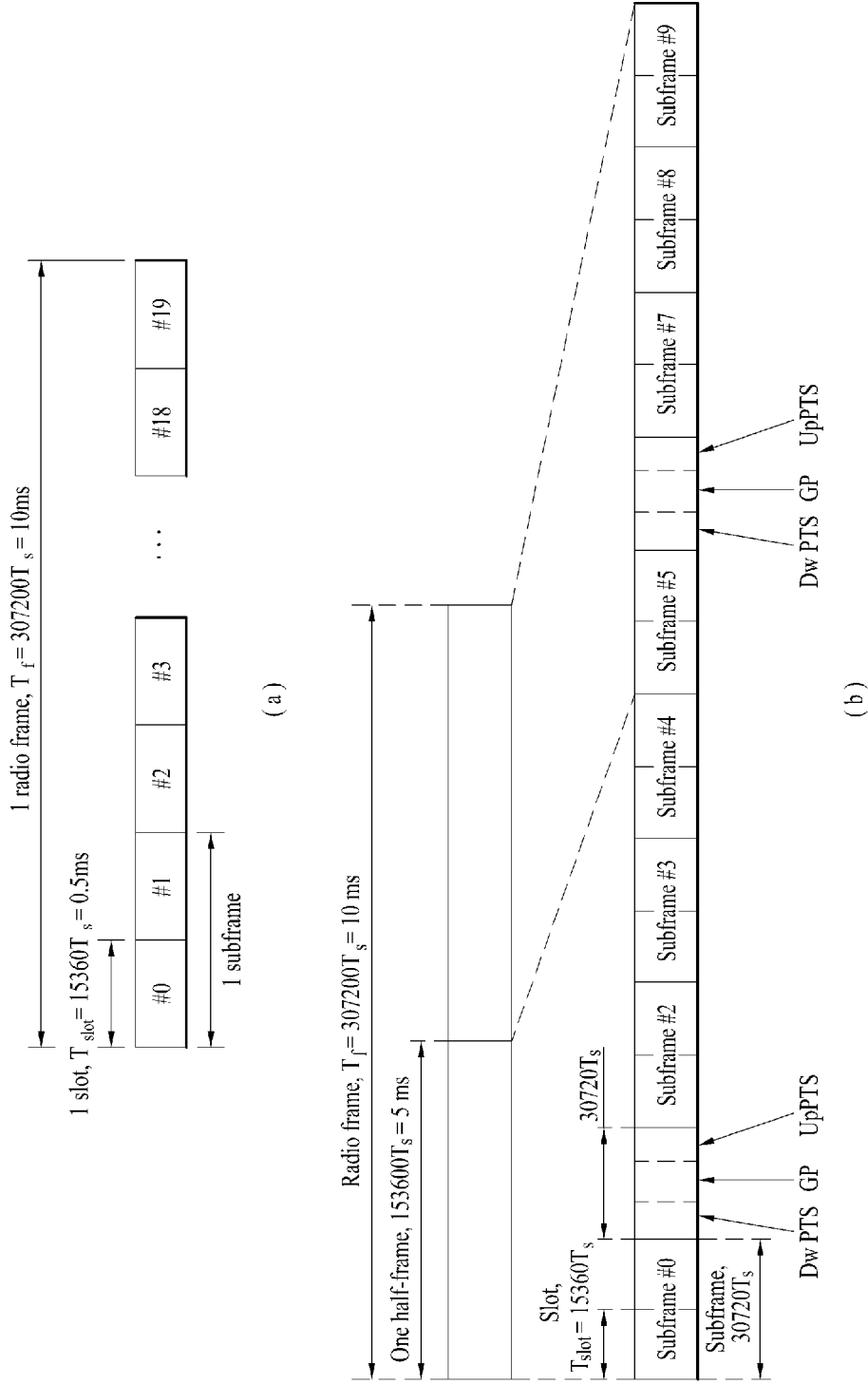
FIG. 1 is a diagram for an example of a radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | \multicolumn{3}{c}{Normal cyclic prefix in downlink} | \multicolumn{3}{c}{Extended cyclic prefix in downlink} |
|---|---|---|---|---|---|---|
| | | \multicolumn{2}{c}{UpPTS} | | \multicolumn{2}{c}{UpPTS} |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
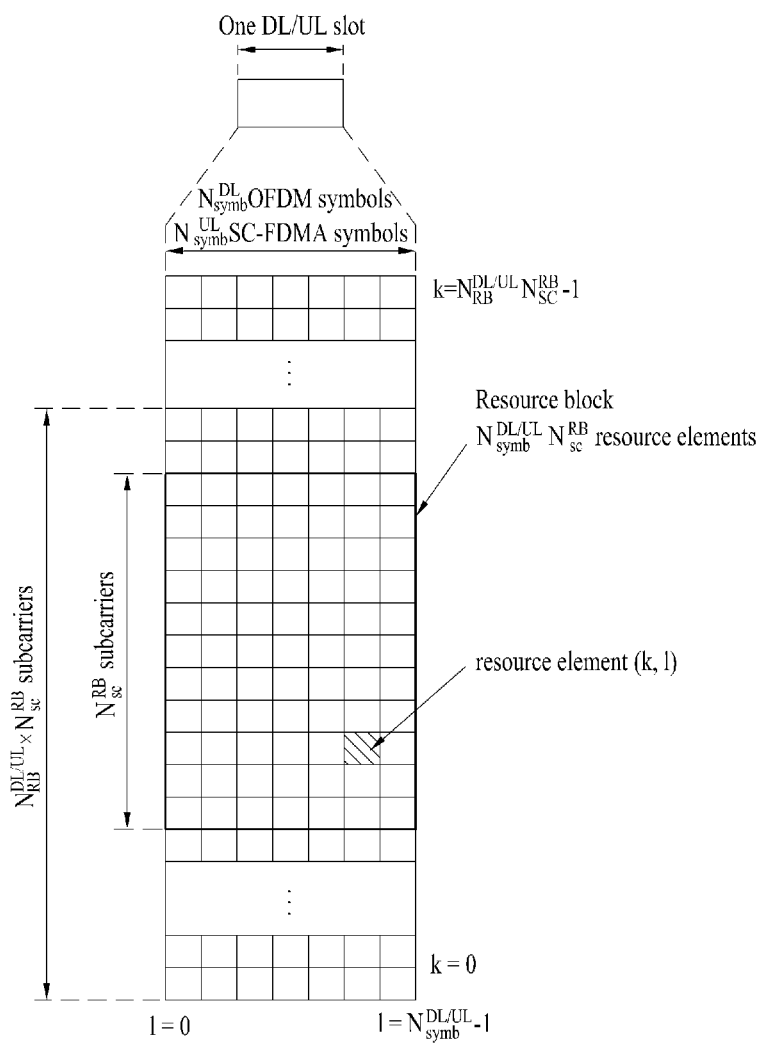
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
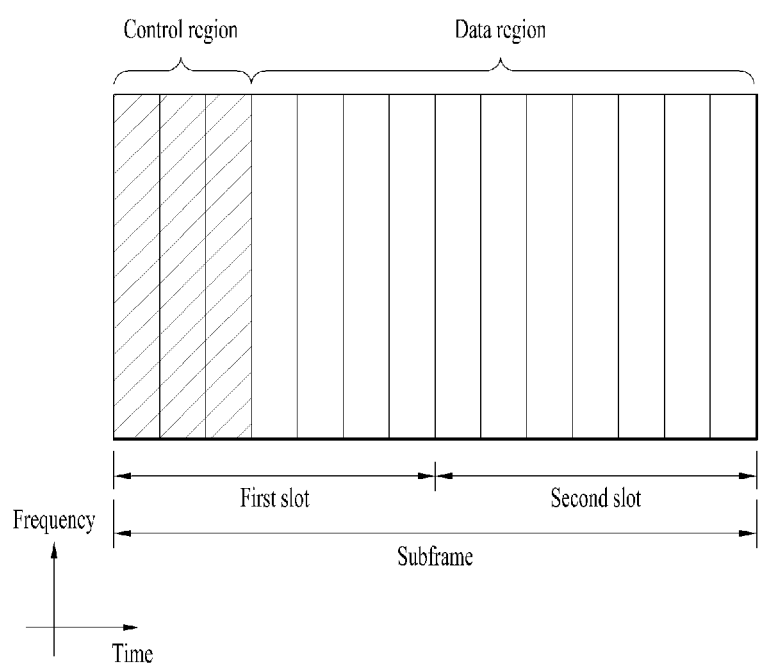
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
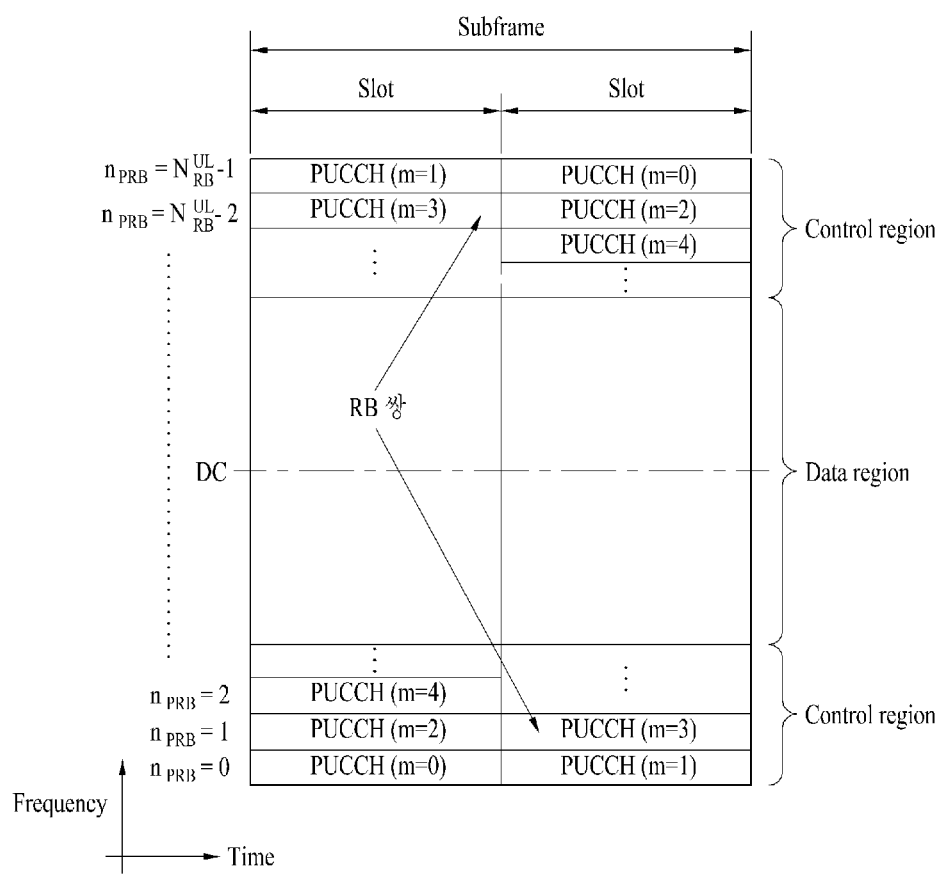
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted, and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Channel State Information-Reference Signal (CSI-RS)

In 3GPP LTE(-A), the antenna port for transmitting a CSI-RS is referred to as a CSI-RS port, and the location of resources in a predetermined resource region where a CSI-RS port(s) transmits a corresponding CSI-RS(s) is referred to as a CSI-RS pattern or a CSI-RS resource configuration. In addition, a time-frequency resources where the CSI-RS is allocated/transmitted is referred to as a CSI-RS resource. For example, a resource element (RE) used for CSI-RS transmission is referred to as a CSI-RS RE. Compared to the CRS where the location of the CSI-RS RE is fixed for each antenna port, the CSI-RS has a maximum of 32 different configurations to reduce inter-cell interference (ICI) under a multi-cell environment including a heterogeneous network environment. The CSI-RS configuration may depend on the number of antenna ports in a cell and be implemented such that neighboring cells have different structures. Unlike the CRS, the CSI-RS may support a maximum of 8 antenna ports (p=15, p=15, 16, p=15, . . . , 18, and p=15, . . . , 22) and is defined only for f=15 kHz. Antenna ports of p=15, . . . , 22 may correspond to CSI-RS ports of p=0, . . . , 7, respectively.

The CSI-RS configuration may depend on the number of CSI-RS ports. If two CSI-RS ports are used for CSI-RS transmission, there are 20 CSI-RS configurations. If four CSI-RS ports are used for CSI-RS transmission, there are 10 CSI-RS configurations. If 8 CSI-RS ports are used for CSI-RS transmission, there are five CSI-RS configurations. A number may be assigned to each of the CSI-RS configurations defined according to the number of CSI-RSs.

The CSI-RS configurations have the nested property. The nested property may mean that the CSI-RS configuration for a large number of CSI-RS ports becomes a super-set of that for a small number of CSI-RS ports. For example, REs in CSI-RS configuration 0 for four CSI-RS ports may be included in resources in CSI-RS configuration 0 for 8 CSI-RS ports.

A plurality of CSI-RSs may be used for a given cell. In the case of a non-zero power CSI-RS, a single CSI-RS configuration may be used for transmission thereof. Meanwhile, in the case of a zero-power CSI-RS, a plurality of CSI-RS configurations may be used for transmission thereof. A UE may assume zero transmission power for resources except resources that the UE should assume as the non-zero power CSI-RS among resources corresponding to the zero-power CSI-RS. In the case of a TDD radio frame, no CSI-RS is transmitted in any one of a special subframe in which DL transmission and UL transmission coexist, a subframe in which a paging message is transmitted, and a subframe in which transmission of a synchronization signal, a physical broadcast channel (PBCH) or system information block 1 (SIB1) collides with the CSI-RS. That is, the UE assumes that no CSI-RS is transmitted in the above subframes. Meanwhile, time-frequency resources used by a CSI-RS port for transmission of a corresponding CSI-RS are not used for PDSCH transmission on any antenna ports. In addition, these time-frequency resources are not used for CSI-RS transmission on other antenna ports except the corresponding CSI-RS port.

Since time-frequency resources used for CSI-RS transmission are not used for data transmission, data throughput decreases as CSI-RS overhead increases. Therefore, the CSI-RS may be configured such that it is transmitted at every predetermined transmission period corresponding to multiple subframes, instead of being transmitted in each subframe. In this case, CSI-RS transmission overhead may be significantly reduced compared to when the CSI-RS is transmitted in each subframe. Hereinafter, a subframe configured for CSI-RS transmission is referred to as a CSI-RS subframe.

A BS may inform a UE of the following parameters through higher layer signaling (for example, medium access control (MAC) signaling, radio resource control (RRC) signaling, etc.)

Number of CSI-RS ports

CSI-RS configuration

CSI-RS subframe configuration, $I_{CSI-RS}$

CSI-RS subframe configuration period, $T_{CSI-RS}$

CSI-RS subframe offset, $_{CSI-RS}$

If necessary, the BS may inform the UE of not only the configuration of a CSI-RS transmitted with zero power but also the configuration of a subframe in which the zero-power CSI-RS is transmitted.

Channel State Information-Interference Measurement (CSI-IM)

In 3GPP LTE Rel-11, a UE may be configured with one or more CSI-IM resource configurations. A CSI-IM resource is used for interference measurement. The CSI-RS configuration and the CSI-RS subframe configuration ($I_{CSI-RS}$) may be configured for each CSI-IM resource through higher layer signaling.

CSI Reporting

In the 3GPP LTE (-A) system, a UE is defined to report CSI to a BS. Herein, the CSI means information indicating the quality of a radio channel (also called a link) created between a UE and an antenna port. The CSI includes, for example, a rank indicator (RI), a precoding matrix indicator (PMI), and a channel quality indicator (CQI). The RI, which indicates rank information of a channel, means the number of streams that a UE receives on the same time-frequency resource. The RI is determined depending on long-term fading of a channel, and thus it is usually fed back to a BS by a UE with a longer periodicity than that of the PMI or CQI. The PMI is a value reflecting the channel space property and indicates a precoding index preferred by a UE based on a metric such as a signal-to-interference-plus-noise ratio (SINR). The CQI is a value indicating the intensity of a channel and typically indicates a received SINR obtained when the PMI is used by a BS.

Based on measurement of the radio channel, a UE calculates its preferred PMI and RI, which is capable of attaining the optimal or highest transmission rate when used by a BS, in the current channel state and feeds back the calculated PMI and RI to the BS. Herein, the CQI refers to a modulation and coding scheme of providing an acceptable packet error probability for the fed-back PMI/RI.

New Radio Technology (NR)

Hereinabove, the structure, operation or function of the 3GPP LTE (-A) system has been described. The structure, operation, or function of the 3GPP LTE (-A) system may be slightly modified or differently implemented in the NR system. It will be described in brief.

The NR system supports various numerologies. For example, the NR system supports not only a subcarrier spacing of 15 kHz but also a subcarrier spacing that is $2^n$ times higher than the 15 kHz subcarrier spacing (where n=1, 2, 3, or 4).

In the case of a normal CP, the number of OFDM symbols in each slot (hereinafter, an OFDM symbol is simply referred to as a symbol) is fixed to 14, but the number of slots in one subframe is supported up to $2^k$ (where k=0, 1, 2, 3, or 4). However, a radio frame is composed of 10 subframes as in the legacy LTE system. In the case of an extended CP, the number of symbols in each slot is fixed to 12, and one subframe is composed of four slots. In addition, one RB is defined as 12 consecutive subcarriers in the frequency domain as in the legacy LTE system.

The usage of each symbol (e.g., DL symbol, UL symbol, or flexible symbol) in one slot may be defined depending on slot formats, and both DL and UL symbols may be configured in one slot. This structure is referred to as a self-contained subframe (or slot) structure.

The present disclosure proposes a method of configuring and/or signaling resources for more accurate channel and interference measurement in a full-dimension MIMO (FD-MIMO) environment and multi-antenna transmission in NR when a channel measurement resource (CMR) (e.g., non-zero power (NZP) CSI-RS) overlaps with an interference measurement resource (e.g., zero power (ZP) CSI-RS based interference measurement resource (IMR)) and operation therefor.

In the NR system, the performance of MU-MIMO is further considered to support an increasing number of UEs. For multiple users, it is necessary to measure the effect of interference between UEs, and thus, the number of IMRs needs to be increased compared to that of the legacy LTE system. For enhanced FD-MIMO (eFD-MIMO), a maximum of 64 transmission antenna ports are considered instead of a maximum of 8 transmission antenna ports in the legacy LTE-A system. In addition, the number of transmission antenna ports is expected to be further increased in NR-MIMO. However, in this case, since the number of REs allocated for a CSI-RS for CSI measurement increase, overhead may increase.

To reduce the overhead, the NR system considers that multiple UEs perform channel and interference measurement on overlapping resources. For example, multiple UEs may be configured with the same resources as the CMR and IMR, or one resource may be set as the CMR and IMR. In this case, a UE may perform channel measurement on a corresponding resource and then consider as interference the remaining signal obtained by subtracting a measured channel from the measurement results on the corresponding resource.

However, when this method is applied, the channel measurement may become inaccurate due to overlapping interference. The legacy LTE system supports an operation of protecting NZP CSI-RS resources through rate-matching to allow to perform the channel measurement on perfect resources. However, when the interference measurement is performed on resources for the channel measurement, interference or random signaling indicating the interference may be transmitted to transmitted on the corresponding resources, and as a result, the signaling may act as interference in the channel measurement.

Figure 5:
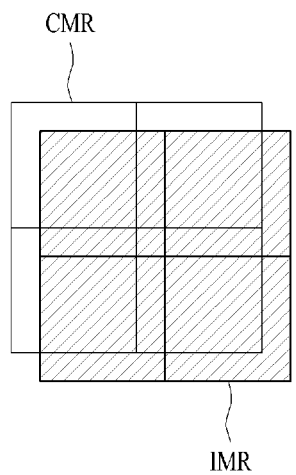
FIGS. 5 to 8 illustrate that a channel measurement resource and an interference measurement resource overlap with each other.

To solve the problem caused when interference is measured according to the above method, the present disclosure proposes a method of configuring a CMR and an IMR that overlap with each other and operation therefor. For convenience of description, the overlapping CMR and IMR is referred to as a CIMR. FIG. 5 illustrates a fully overlapping CIMR.

In the present specification, the term "base station" may refer to a transmission and reception point such as a cell, base station, eNB, gNB, sector, transmission point (TP), reception point (RP), remote radio head (RRH), relay, etc. In addition, the term may be used as a comprehensive term for identifying a component carrier (CC) at a specific transmission and reception point.

In particular, in the present specification, a point at which a DL/UL signal is transmitted/received to/from a UE is referred to as a transmission and reception point (TRP) for convenience of description. The TRP may correspond to a specific physical cell, a plurality of physical cell groups, a specific analog beam, or a specific analog beam group.

In addition, an antenna port may mean a virtual antenna element where the same channel characteristics (e.g., delay profile, Doppler spread, etc.) can be assumed (at least in the same RB). Moreover, a slot may mean a repeated transmission unit having a predetermined time length, but the definition thereof may be changed for each numerology.

Although the present disclosure is described based on the 3GPP LTE system for convenience of description, but the disclosure is applicable to other systems (e.g., NR, UTRA, etc.) besides the 3GPP LTE system.

For the above-described operation, a specific configuration for using as the CIMR a resource with a specific feature may be directly configured by a measurement setting. In this case, it may be assumed that the measurement based on the corresponding resource uses a CIMR-related base configuration (for example, high density) and operation therefor, which will be described later. Alternatively, the CMR and IMR are separately linked by the measurement setting. However, if the resources (or indices) indicated by links are the same or fully/partially overlap with each other, a UE may operate on the assumption that the overlapping resource portion corresponds to the CIMR. Particularly, this operation may be used when interference emulated by a NZP CSI-RS precoded on the corresponding CIMR or a PDSCH is transmitted on the IMR and/or when a non-precoded NZP CSI-RS is transmitted as interference to measure an interference channel.

When this method is applied, channel measurement may become inaccurate due to overlapping interference. The legacy LTE system supports an operation of protecting NZP CSI-RS resources through rate-matching to allow to perform the channel measurement on perfect resources.

However, when the interference measurement is performed on resources for the channel measurement, interference or random signaling indicating the interference may be transmitted on the corresponding resources, and as a result, the signaling may act as interference to the channel measurement. In addition, there may a residual NZP CSI-RS on the configured resources due to the inaccurate channel measurement, and the interference measured on the corresponding resources also increases. As a result, the CQI may not exceed a predetermined level.

1. Solution Related to CMR or CIMR Configuration
   1) Configuration of CMR or CIMR Density If the density of the CMR increases, the performance of channel measurement may be improved. Thus, when interference measurement is performed on an overlapping resource, the base density for the CIMR may be defined as follows: base density for CIMR, $D_{CIMR}>1$ RE/port/RB (e.g., $D_{CIMR}=4$). If there is no separate configuration, $D_{CIMR}$ may be applied. If there is a density configuration for the CIMR, the configured 'density for the CIMR' may be used for the CIMR. In addition, the density configuration may be applied with respect to $D_{CIMR}$. In other words, assuming that density=1/2 is configured for the corresponding resource, other NZP CSI-RSs may have 1/2 REs/ports/RBs with respect to base density=1 RE/port/RB, but the CIMR may have 2 REs/ports/RBs with respect to $D_{CIMR}=4$ REs/ports/RBs. That is, the resource density may be configured in a different range from that of other RSs, and more particularly, in a wider range. In particular, $D_{CIMR}$ may be different from, and more particular, higher than the base density (for example, 1 RE/port/RB) of other (NZP or ZP) CSI-RS. Since the required density increases when this method is used, there may be a restriction on a specific parameter(s) for such a resource (for example, the number of ports<=4) to reduce resource overhead.

On the other hand, if the density of a resource is set to be more than or equal to a predetermined value (for example, density>=$D_{CIMR}=4$) in a specific NZP CSI-RS configuration, a UE may consider the resource as the CIMR. This operation may be applied only to a resource of which the reporting type includes CSI reporting. Alternatively, if the CSI-RS is divided into a CSI-RS for beam management or a CSI-RS for CSI acquisition, the operation may be applied to the CSI-RS for CSI acquisition.

$D_{CIMR}$ may be predetermined or configured through higher-layer signaling. In particular, $D_{CIMR}$ may be included in a resource setting.

2) Port Configuration

As another method, the above-described CIMR may be configured by allocating a specific port index (or indices). In other words, port X may be defined and used to indicate the above-described overlapping resource. In particular, port X may correspond to a separate port index (or indices) which are not allocated for other existing RSs, for example, a DMRS, a CSI-RS, etc. A UE may measure a channel, and more particularly, RSRP and interference on the corresponding resources. The specific port index may be limited to a specific port number, for example, one port and have high density as described above.

Alternatively, the CIMR may be defined as a resource group and/or a port group. The resource/port to be used by a UE for measurement may be limited to some resources/ports in a resource/port group, for example, one port. In this case, the UE may calculate CSI by regarding as the IMR a resource/port with the lowest index or a random resource/port in the indicated resource/port group. This may be interpreted to mean that although there is no resource/port indicated by specifications, interference measurement is performed on a resource that is always used among corresponding resources/ports, for example, a resource with the lowest index.

3) Density Configuration 2 (RB Basis)

Figure 7:
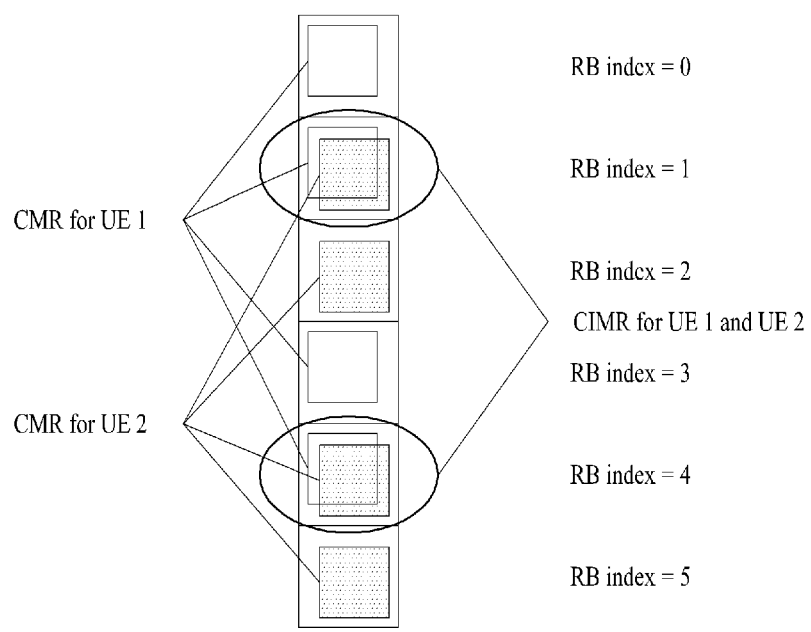

The CMR and IMR are configured to overlap at the RE level but have different density at the RB level. For example, the CMR may be configured to be transmitted in each RB, but the IMR may be configured to be transmitted only in RBs with even indices. Accordingly, the CMR and IMR partially overlap. FIG. 7 illustrates that the CMR and IMR partially overlap.

Figure 6:
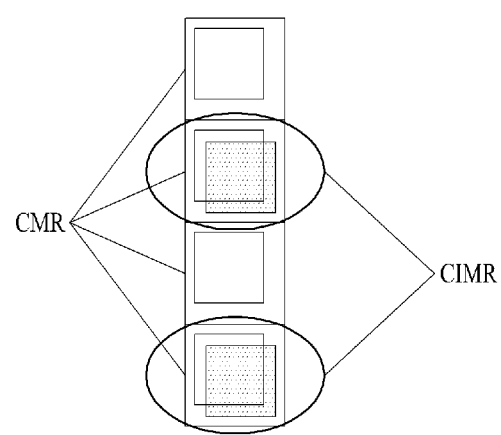

If two or more UEs perform channel measurement (CM) and interference measurement (IM), the same RS density may be maintained for each UE from the perspective of the network, and at the same time, the density and transmission pattern of the CMR may be different from those of the IMR from the perspective of the UE. In particular, if the two or more UEs perform the CM and IM on the CIMR, the measurement results of the UEs may be guaranteed at a certain level. For example, the CMR of cell 1 may correspond to an RB with the following RB index: (RB index) mod 3=0 or 1, the CMR of cell 2 may correspond to an RB with the following RB index: (RB index) mod 3=1 or 2, and the IMR may correspond to an RB with the following RB index: (RB index) mod 3=1. That is, the RB with the following RB index: (RB index) mod 3=1 may act as the overlapping IMR. In this case, each UE is configured with density 2/3. When a specific density parameter is configured for a resource (for example, when the density is not (1/2)^n), the UE may implicitly assume that the corresponding resource is used as the CIMR or the CMR/IMR for performing the CIMR-related operation. In this case, different offsets (e.g., (RB index) mod x values) may be configured so that the UEs may be allocated different CMRs (or CIMRs). FIG. 6 illustrates an partially overlapping CIMR configured for two UEs.

4) Density Configuration 3—Time Basis

The CMR and IMR may be configured in the time domain. For example, when the CMR and IMR are set as periodic/semi-persistent resources, the period of the IMR may be n times greater than that of the CMR (where n is a natural number). Alternatively, a slot where the CMR and IMR are configured may be indicated using the slot number instead of the RB index.

5) Density Configuration 4—Port Basis (Port Cycling)

Figure 8:
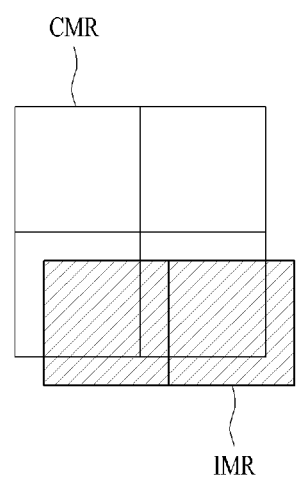

A method of configuring the density of two resources such that the two resources partially overlap at the port level as shown in FIG. 8 is also considered. To guarantee the performance of CM in a region where there is no overlapping IMR, rate-matching may be performed in the corresponding resource region while this method is applied.

However, the method has a problem that the performance degradation caused by interference is concentrated on a specific NZP CSI-RS port. To solve such a problem, the location of the IMR may be changed for each resource unit (e.g., RB (group), slot (group), etc.). Specifically, the IMR may be configured such that the IMR is cycled for each resource unit (e.g., symbol, subcarrier, etc.) (within the CIMR) (according to a specific indicated/configured pattern). For example, in an odd RB, half of the REs having low frequencies may be regarded as the IMR (or CIMR), and in an even RB, half of the REs having high frequencies may be regarded as the IMR (or CIMR). This operation may be applied when interference emulated by a NZP CSI-RS precoded on the corresponding CIMR is transmitted in a similar way as described above.

Figure 10:
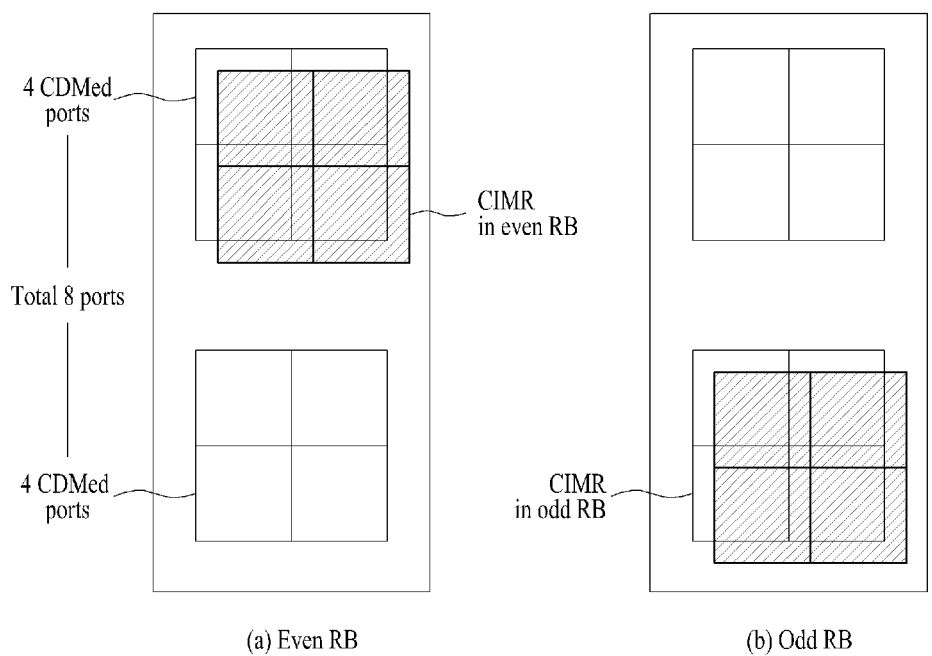

A specific configured/indicated port or port group may be used as the resource unit for cycling. For example, one code division multiplexing (CDM) pattern may be used as the resource unit. In other words, in the case of a 8-port CSI-RS resource, length-4 CDM may be applied to two portions. Accordingly, cycling may be performed for every four REs where the same CDM is applied. FIG. 10 illustrates a relevant example.

Figure 9:
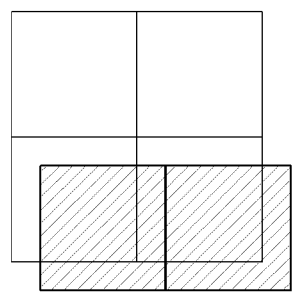
FIGS. 9 to 14 illustrate that a channel measurement resource and an interference measurement resource overlap with each other according to a predetermined rule.
Figure 9:
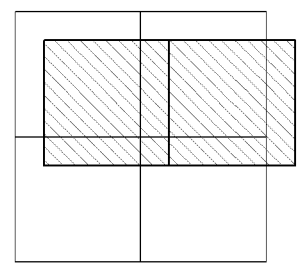
Figure 9:
Figure 9:
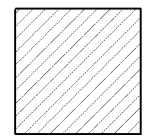
Figure 11:
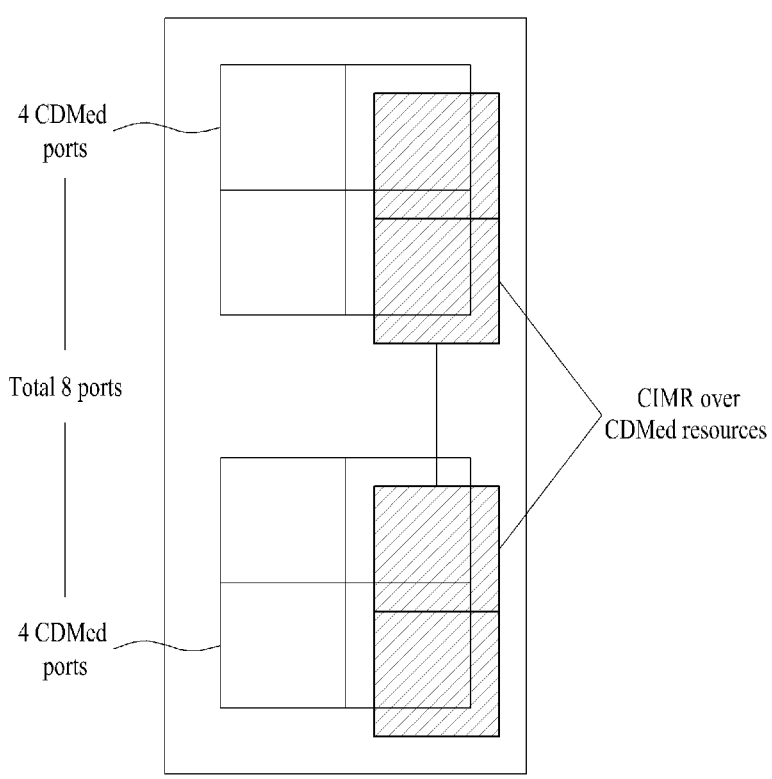

In particular, when some CSI-RS resources where CDM is applied overlaps, the CDM effect may average channel estimation noise caused by interference for all code division multiplexed (CDMed) CSI-RS resources with no cycling. For example, when a 4-port CMR is CDMed over four REs as shown in FIG. 9, an IMR defined over two REs may slightly degrade the performance of the CMR. Thus, the operation related to the partially overlapping CIMR may be limited to an operation of overlapping some CDMed resources. To this end, when the CIMR is defined using multiple resources to which different CDM is applied, a resource partially overlapping with each CDMed resource may be defined as the CIMR. FIG. 11 illustrates a relevant example.

A cycling pattern may be included in the resource setting of an overlapping resource. This may be performed by configuring one of a plurality of predefined cycling patterns. Alternatively, the cycling pattern may be implicitly determined by the cell ID, the index of a UE group (UEs sharing an overlapping CMR/IMR), or a parameter similar thereto. Thus, if the measurement setting is linked to the CIMR, in the case of CSI reporting linked to the same measurement setting, CSI is calculated/reported using the indicated CIMR according to the above-described measurement method. Alternatively, the same configuration may be included in the measurement setting together with a CIMR indication.

The cycling pattern may be signaled to the UE through MAC signaling for flexibility. Alternatively, the cycling pattern may be configured as follows. First, two or more IMRs are configured, low density (e.g., 1/2 RE/port/RB) is configured for each IMR, and then a different offset is configured for each IMR. In this case, the UE may be provided with dependency between two IMRs, i.e., an indication indicating that the two resources are used for the same IM.

In particular, when the CMR and IMR partially overlap, the location of the IMR (within the CMR or CIMR) may be configured. In addition, when the CMR and IMR partially overlap (within the CMR and CIMR), the density may be configured for each of the CMR and IMR, but the two resources may be configured not to overlap by configuring a different offset for each of the CMR and IMR. The IMR density may be configured with respect to the CMR density (for example, the IMR density may be a half of the CMR density). Further, which of the above-described partially overlapping methods will be used may also be indicated.

2. Solution Related to CMR or CIMR Power Configuration

To improve the performance of CM on an overlapping resource, CMR power boosting may be performed on the overlapping resource. For example, when a 4-port CIMR is configured, if only ports 2 and 3 overlap and are used as the CIMR, P_c_cimr, which is used for the CIMR, may be further configured on the corresponding resource (e.g., port group) besides P_c. In this case, when calculating CSI, a UE may use different values of P_c and/or P_c_cimr for each port group. In the case of the value of P_c_cimr, the power ratio of P_c_cimr to P_c may be signaled to reduce signaling overhead. This may be used not only for a partially overlapping case but also a fully overlapping case. In this case, the configured value of P_c_cimr may be used as the power value for a corresponding resource, instead of using P_c. Similarly, the CMR and IMR partially overlap on an RB basis, P_c and P_c_cimr may be used for an RB set to the CMR and an overlapping resource, i.e., an RB set to the CIMR, respectively. The value of P_c and P_c_cimr may be included in a resource configuration or transmitted through MAC or DCI to dynamically indicate the value.

3. CIMR Density Configuration

Figure 12:
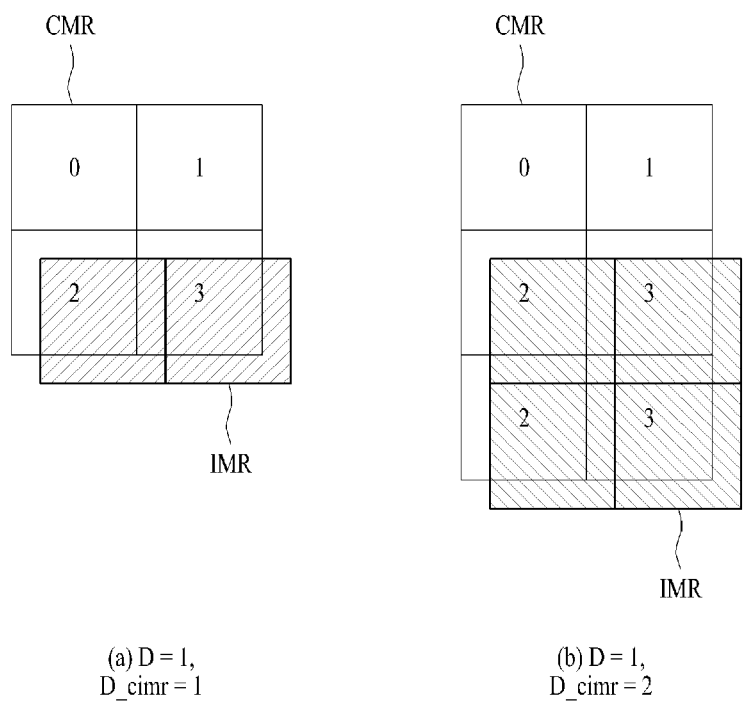

The density of an overlapping resource may increase for the same purpose, i.e., to improve the performance of CM on the overlapping resource. To this end, in addition to CSI-RS density D, D_cimr may be further configured, and it may be used for each of the CIMR and IMR. In this case, it may be assumed that among boosted CIMRs, the CMR part (e.g., port group) is duplicated and transmitted. As shown in FIG. 12, the number in a CMR box indicates the port index.

In addition, rate-matching, which is cycled in the same manner, may be required. The rate-matching may be considered when additional interference is cancelled on an overlapping resource or when inter-cell interference is measured on other resources which do not overlap. Accordingly, rate-matching cycling may be configured in a similar manner.

Figure 13:
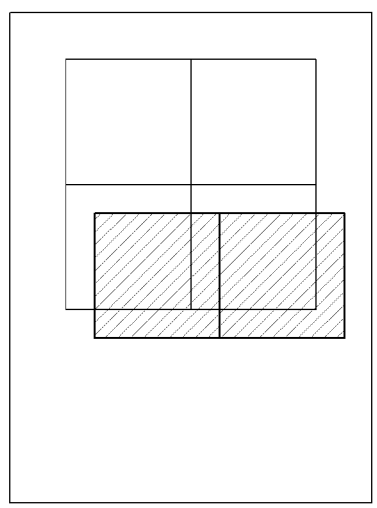
Figure 13:
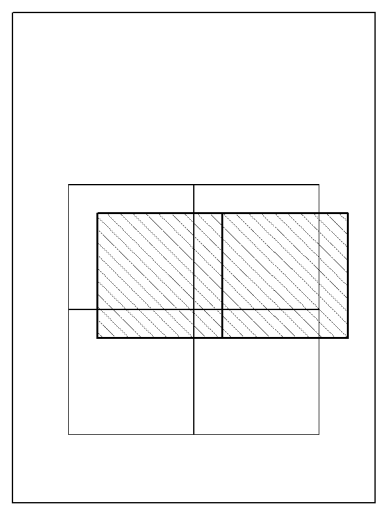
Figure 13:
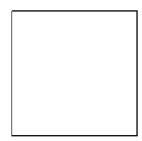
Figure 13:
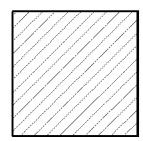

Meanwhile, instead of the CIMR, the CMR may be cycled as shown in FIG. 13. This method may be applied when it is different to cycle the CIMR since the corresponding resource is shared by UEs. In this method, the above-described cycling-related parameters may be applied to the CMR rather than the CIMR or IMR.

When two or more UEs intend to use the CIMR for CM, the CMR for the two UEs may be configured as described above, but different offsets may be configured. In this case, the operation shown in FIG. 14 may be supported.

Figure 14:
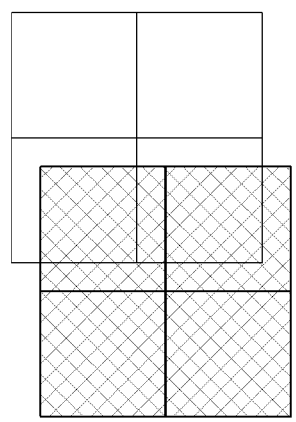
Figure 14:
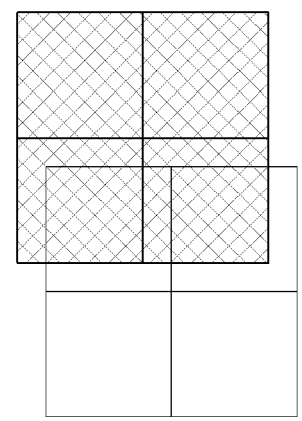
Figure 14:
Figure 14:

Alternatively, in this case, a partially overlapping and shared resource may be configured from the perspective of the network, and the corresponding resource may be cycled and used by each UE. For example, a 6-port shared resource is configured from the perspective of the network as shown in FIG. 14. In addition, although each UE is configured to use four ports only, cycling may be performed on a 6-port resource including the corresponding resource. As described above, CM may be performed on a configured resource, and IM may be performed on some configured REs (or ports). In particular, in this case, the location of the CMR is also cycled.

According to the above method, although resources are cycled in the frequency domain, it may be advantageous that the resources are cycled in the time domain, considering that the channel correlation in the time domain is high. That is, the present disclosure is not limited to how resources are cycled.

4. Configuration Signaling Method

When an aperiodic IMR is used, the above-described operation may inform a UE of the CIMR through an aperiodic IMR indication included in DCI. Alternatively, when the CMR (and more particularly, a CMR with no CIMR configuration) is configured by the aperiodic IMR indication, the UE may operate by recognizing a corresponding resource as the CIMR. The signaling may include an operation of signaling the resource and/or cycling pattern related parameter according to the present disclosure to the UE through DCI. Alternatively, to reduce DCI overhead, the UE may be preconfigured with the parameters for a CIMR case, for example, the resource and/or cycling pattern related parameter through separate higher layer signaling. Then, the UE may apply a corresponding configuration if the CMR is indicated by DCI.

The above-described IM method using an overlapping resource may be limited to an aperiodic IMR overlapping with a semi-persistent/periodic CMR. In this case, the UE may perform more accurate CM on the CMR based on the measurement results in a previous slot(s).

In the LTE system, P_c is defined to adjust power measured by CM when the measured power is used for CQI calculation. In the above CIMR configuration, the same value of P_c is applied to a transmitted channel and interference for the CQI calculation. Alternatively, when P_c and an interference power assumption, P_d, which is a similar concept to P_c, are configured, the CQI calculation may be performed by regarding P_c and P_d as channel and interference power assumptions, respectively. In particular, when the performance of the CM is intended to be improved by power-boosting the CMR part of the CIMR, such a parameter may be transmitted to the UE since the power of the CMR needs to be adjusted when the CQI is actually calculated. To this end, the corresponding parameter may be configured through relatively dynamic signaling such as MAC or DCI. In addition, when the CIMR is transmitted by the same TRPs, the UE may operate based on the value of P_c, i.e., by assuming that P_d=1−(CSI-RS power ratio derived from value of P_c) since the total power is determined.

In the case of CSI reporting using the above-described resource, the CQI may not increase more than a predetermined CQI due to an error in channel estimation. Accordingly, CQI reporting using the above-described resource may be performed within a limited range of CQI indices compared to normal CQI reporting. When the CSI reporting is performed based on the CIMR as described above, a BS may configure/manage a separate reduced CQI table, and a UE may report CSI based on the corresponding CQI table. The reduced CQI table may be defined or configured in advance. Alternatively, the BS may configure the reduced CQI table for the UE by subsampling an existing CQI table. The subsampling corresponds to a method of limiting indices in the existing CQI table. According to the sub sampling, the maximum CQI index or a parameter corresponding thereto is configured for the UE, and then the UE perform CQI reporting within consecutive CQI indices from CQI index 0 to the indicated maximum CQI index.

The UE may inform the BS of channel estimation performance (i.e., CQI performance regarding residual interference) as UE capability information, and the BS may configure the reduced CQI table and RS density for the UE based on the received UE capability information.

5. IM Method when there is No Explicit CIMR Configuration

When a UE is configured with one NZP CSI-RS and there is no configured IMR, the CM method described in the present disclosure, i.e., the method of measuring a NZP CSI-RS and regarding the remaining part of the same resource except corresponding measurement as interference may be used. In this case, if the UE is configured with one NZP CSI-RS for CM, the UE may use the corresponding resource for IM.

If a UE is configured with a plurality of NZP CSI-RSs, the UE may use the following methods.

1. Among NZP CSI-RS resources configured for the UE, a resource(s) is selected/reported through a CSI-RS resource indicator (CRI).

IM is performed on a NZP-CSI-RS resource(s) corresponding to CSI, which the UE most recently selects/reports using the CRI or will report together with the CRI. Since the NZP-CSI-RS resource(s) is associated with a CSI-RS for a data transmission channel, interference measured on the same resource(s) is applicable to UE's CSI derivation/reporting.

2. The UE selects a NZP CSI-RS resource(s) for IM from among NZP CSI-RS resources configured for the UE and then measures interference.

The UE measures the interference by selecting a specific resource(s) from among the given NZP CSI-RS resources and then report the index (or indices) of the resource(s) used for the IM. Particularly, in this case, the UE may perform CM using a NZP CSI-RS suitable for the CM, i.e., a NZP CSI-RS with the highest channel power and then perform the IM and CSI calculation on a corresponding resource(s). To this end, a requirement (e.g., power threshold) regarding a NZP CSI-RS suitable for the IM may be configured.

The UE may report the resource(s) (e.g., index/indicator (or indices/indicators)) used for the IM to a BS.

The (maximum) number of NZP CSI-RS resources to be selected and used by the UE may be configured.

3. Interference is measured on all NZP CSI-RSs configured for the UE.

In this case, since the number of resources for IM increase, more stable IM may be performed. However, if a NZP CSI-RS that is not suitable for CM is included, a channel may be erroneously measured so that the IM may also be erroneous.

As another method, the UE may report to the BS the indices of top K resources causing high interference among the configured resources. In this case, the IM operation may be used by the BS to measure the amount of interference that the UE receives from an analog beam transmitted on each CSI-RS resource for beam-level scheduling instead of CSI calculation.

4. Interference is measured on a resource with the largest number of REs (e.g., the largest number of ports, highest density, etc.) among NZP CSI-RS resources configured for the UE.

For stable IM, the interference is measured on the NZP CSI-RS with the largest number of REs (e.g., the largest number of ports, highest density, etc.). In this case, since many resources are used for measurement, more stable CM and IM may be performed.

5. Interference is measured on a resource with the lowest index among NZP CSI-RS resources configured for the UE.

When there is no separate configuration, the UE may perform IM on the resource with the lowest index to remove ambiguity between the BS and UE.

The above operations may be performed only on a resource satisfying the requirement of using a resource(s) for IM (e.g., CIMR requirement) among a plurality of given NZP CSI-RS resources.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, it may be regulated that information on whether the proposed methods are applied (or information on rules related to the proposed methods) should be transmitted from a BS to a UE through a predefined signal (e.g., a physical layer signal, a higher layer signal, etc.).

Figure 15:
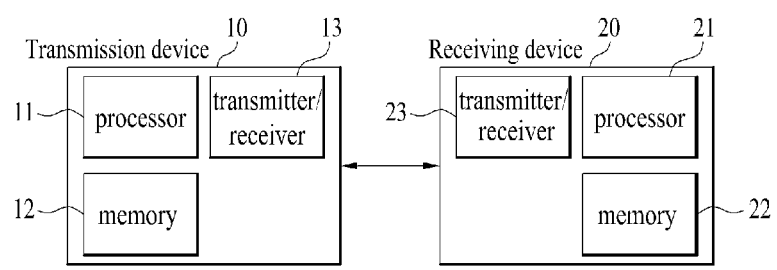
FIG. 15 is a block diagram for a device configured to implement embodiment(s) of the present disclosure

FIG. 15 is a block diagram of a transmitting device 10 and a receiving device 20 configured to implement exemplary embodiments of the present disclosure. Referring to FIG. 15, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

In one of the embodiments of the present disclosure, provided is a UE for performing channel and interference measurement in a wireless communication system. The UE may include a transmitter, a receiver, and a processor configured to control the transmitter and the receiver. The processor may be configured to receive a resource configuration for the channel and interference measurement from a BS, wherein a resource for the channel and interference measurement is shared by a plurality of UEs served by the BS, and perform the channel and interference measurement based on the received resource configuration for the channel and interference measurement. The resource for the channel and interference measurement may include a resource corresponding to a portion where a resource for the CM and a resource for the IM fully or partially overlap. The fully or partially overlapping resource may be configured for each antenna port or antenna port group corresponding to the resource for the channel measurement or the resource for the interference measurement or by a different code division multiplexing pattern.

Additionally, when the fully or partially overlapping resource is configured for each antenna port, an antenna port used for the resource configuration may be cycled and used depending on a resource block including the overlapping resource.

Additionally, a cycling pattern related to the antenna port may be included in the resource configuration or provided through separate signaling.

Additionally, the resource for the channel measurement may correspond to a semi-persistent or periodic channel measurement resource, and the resource for the interference measurement may correspond to an aperiodic interference channel resource.

Additionally, when transmission power boosting is applied to the fully or partially overlapping resource, the processor may be configured to receive a parameter related to the transmission power boosting from the base station. In this case, the parameter related to the transmission power boosting may be used to calculate a channel quality indicator.

Additionally, the processor may be configured to select a channel quality indicator index from a subsampled channel quality indicator table, which is defined or configured by the base station, according to results of the channel and interference measurement and report the selected channel quality indicator index.

As mentioned in the foregoing description, the detailed descriptions for the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations can be made therein without departing from the spirit and scope of the disclosure. Therefore, the present disclosure is not limited by the embodiments disclosed herein but intends to give the broadest scope matching the principles and new features disclosed herein.

INDUSTRIAL APPLICABILITY

The present disclosure may be used for a wireless communication apparatus such as a user equipment (UE), a relay, and an eNB.

The invention claimed is:

1. A method for channel and interference measurement by a user equipment (UE) in a wireless communication system, the method comprising:
receiving, from a base station, a resource configuration for the channel and interference measurement, wherein a resource for the channel and interference measurement is shared by a plurality of UEs served by the base station; and
performing the channel and interference measurement based on the received resource configuration for the channel and interference measurement,
wherein the resource for the channel and interference measurement includes a resource corresponding to a portion where a resource for the channel measurement and a resource for the interference measurement fully or partially overlap, and
wherein the fully or partially overlapping resource is configured for each antenna port or antenna port group corresponding to the resource for the channel measurement or the resource for the interference measurement or by a different code division multiplexing pattern.

2. The method of claim 1, wherein when the fully or partially overlapping resource is configured for each antenna port, an antenna port used for the resource configuration is cycled and used depending on a resource block including the overlapping resource.

3. The method of claim 2, wherein a cycling pattern related to the antenna port is included in the resource configuration or provided through separate signaling.

4. The method of claim 1, wherein the resource for the channel measurement corresponds to a semi-persistent or periodic channel measurement resource, and wherein the resource for the interference measurement corresponds to an aperiodic interference measurement resource.

5. The method of claim 1, further comprising, when transmission power boosting is applied to the fully or partially overlapping resource, receiving a parameter related to the transmission power boosting from the base station, wherein the parameter related to the transmission power boosting is used to calculate a channel quality indicator.

6. The method of claim 1, comprising selecting a channel quality indicator index from a subsampled channel quality indicator table according to results of the channel and interference measurement and reporting the selected channel quality indicator index, wherein the sub sampled channel quality indicator table is defined or configured by the base station.

7. A user equipment (UE) for performing channel and interference measurement in a wireless communication system, the UE comprising:
a transmitter;
a receiver; and
a processor configured to control the transmitter and the receiver,
wherein the processor is configured to:
receive a resource configuration for the channel and interference measurement from a base station, wherein a resource for the channel and interference measurement is shared by a plurality of UEs served by the base station; and
perform the channel and interference measurement based on the received resource configuration for the channel and interference measurement,
wherein the resource for the channel and interference measurement includes a resource corresponding to a portion where a resource for the channel measurement and a resource for the interference measurement fully or partially overlap, and
wherein the fully or partially overlapping resource is configured for each antenna port or antenna port group corresponding to the resource for the channel measurement or the resource for the interference measurement or by a different code division multiplexing pattern.

8. The UE of claim 7, wherein when the fully or partially overlapping resource is configured for each antenna port, an antenna port used for the resource configuration is cycled and used depending on a resource block including the overlapping resource.

9. The UE of claim 8, wherein a cycling pattern related to the antenna port is included in the resource configuration or provided through separate signaling.

10. The UE of claim 7, wherein the resource for the channel measurement corresponds to a semi-persistent or periodic channel measurement resource, and wherein the resource for the interference measurement corresponds to an aperiodic interference measurement resource.

11. The UE of claim 7, wherein when transmission power boosting is applied to the fully or partially overlapping resource, the processor is configured to receive a parameter related to the transmission power boosting from the base station, and wherein the parameter related to the transmission power boosting is used to calculate a channel quality indicator.

12. The UE of claim 7, wherein the processor is configured to select a channel quality indicator index from a subsampled channel quality indicator table according to results of the channel and interference measurement and report the selected channel quality indicator index, and wherein the subsampled channel quality indicator table is defined or configured by the base station.

13. The method of claim 1, wherein the UE is a part of an autonomous driving device that communicates with at least a network or another autonomous driving device.

14. The UE of claim 7, wherein the UE is a part of an autonomous driving device that communicates with at least a network or another autonomous driving device.

\* \* \* \* \*